(No Model.)
C. HARTZELL.
PLOW.
No. 461,113. Patented Oct. 13, 1891.
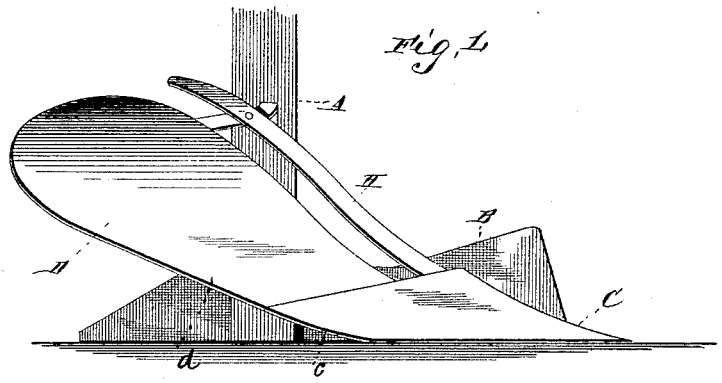
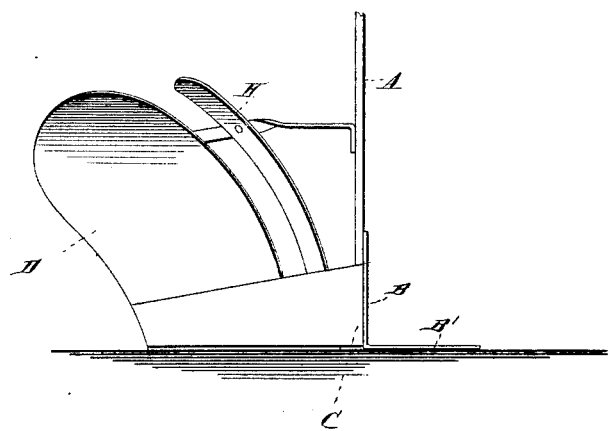
Witnesses
Inventor
Conrad Hartzell,
by E. W. Anderson
his Attorney

United States Patent Office.

CONRAD HARTZELL, OF ST. JOSEPH, MISSOURI.

PLOW.

SPECIFICATION forming part of Letters Patent No. 461,113, dated October 13, 1891.

Application filed December 23, 1890. Serial No. 375,615. (No model.)

*To all whom it may concern:*

Be it known that I, CONRAD HARTZELL, a citizen of the United States, and a resident of St. Joseph, in the county of Buchanan and State of Missouri, have invented certain new and useful Improvements in Plows; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation. Fig. 2 is a front view.

This invention has relation to certain new and useful improvements in plows, the object being to provide an implement of this character which will to a large extent overcome a difficulty which has been heretofore universally experienced—viz., the loading or clogging of the mold-board with earth, especially in damp and sticky soils; and the invention consists in the novel construction and arrangement of the mold-board, as hereinafter described, and in the combination thereof with other features.

In the accompanying drawings, illustrating the invention, the letter A represents the plow-standard; B, the landside, having the undercutting share B' (shown and claimed by me in a previous patent) or a similar device, and C the point or share.

D represents the mold-board, which is of somewhat the usual curved or flaring concave form, but has a much less transverse measurement than mold-boards ordinarily employed, being preferably about one-third less in width than the share C and offset from a line running longitudinally through the point and center of the plow, its lower upwardly-inclined edge $d$ forming a continuation of the edge $c$ of the share C, as shown. The lower and central portions of the mold-board where the greatest pressure of the furrow-slice comes are of less width than the upper portion.

It will be seen that by providing a narrow mold-board and offsetting it from the center of the plow, so as to bring it at the center of the furrow-slice, the whole pressure of turning the furrow will be concentrated upon a minimum surface of mold-board, and consequently will cause the disengagement of the soil adhering thereto, keeping the said mold-board constantly scoured, the plow at the same time turning as large a furrow in proportion to its size as a plow provided with the ordinary mold-board, as the said furrow is partially undercut by the share B' during the passage of the plow in turning the previous furrow. Furthermore, a plow constructed as above described will be of lighter draft and less heavy to handle than a plow of the same size provided with the ordinary mold-board and is adapted for plowing at any desired depth.

In friable soil I use a rod or strip of steel or other suitable metal, which is secured to the iron frame of the plow, running parallel with the mold-board and above the upper edge thereof, being spaced a short distance from the mold-board. This strip is shown at H in the drawings. If it is desired, two of the strips or rods may be employed, one above the other. By means of these, furrows of friable soil may be completely turned, the mold-board being kept scoured, as above described.

Having thus described the invention, what I claim as new, and desire to secure by Letters Patent, is—

1. A plow having a narrow concave mold-board cut away at its upper edge and increasing in width transversely as it extends rearwardly and upwardly, whereby the entire pressure of turning the furrow-slice is brought upon a minimum surface, substantially as and for the purpose specified.

2. The plow having a narrow mold-board cut away at its upper edge, in combination with one or more metal rods or strips running parallel with said mold-board and above its upper edge, said strips being connected at the upper end to a brace-strip of the frame and at the lower end to the share, substantially as specified.

3. In a plow, the combination, with the mold-board, of one or more metal rods or strips running parallel with said mold-board and above its upper edge, said strips being connected at the upper end to a brace-strip of the frame and at the lower end to the share, substantially as specified.

4. In a plow, the combination, with the narrow concave mold-board and the metal rods or strips running parallel therewith and above its upper edge, said strips being connected at the upper end to a brace-strip of the frame and at the lower end to the share, of the land-side having the undercutting share thereon, substantially as specified.

In testimony whereof I affix my signature in presence of two witnesses.

CONRAD HARTZELL.

Witnesses:
JOSEPH MORTON,
FRANKLIN PORTER.